(No Model.)
F. E. DALZELL.
CUTTER HEAD AND CUTTER.
No. 598,364. Patented Feb. 1, 1898.
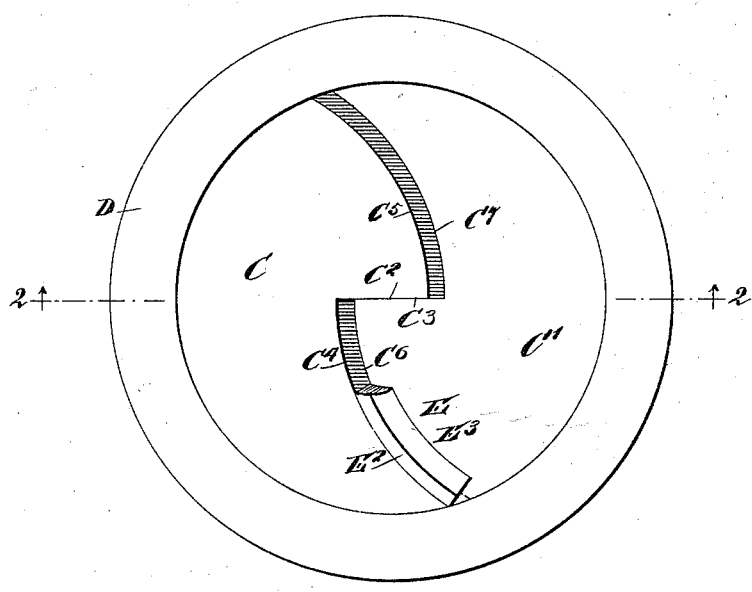
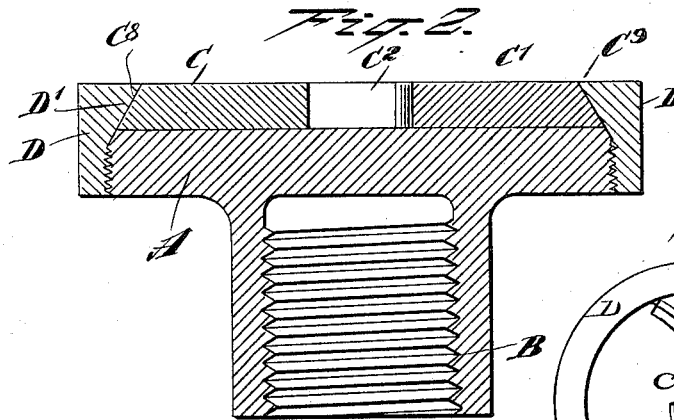
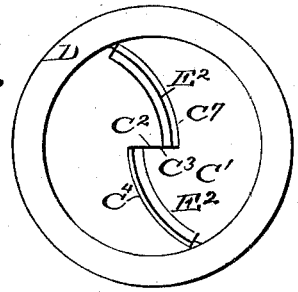
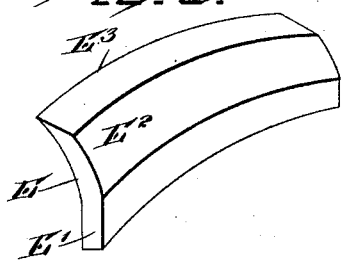
WITNESSES:
Henry T. Hirsch.
Rev. J. Hostet
INVENTOR
F. E. Dalzell
BY
ATTORNEYS.

UNITED STATES PATENT OFFICE.

FRANK EZRA DALZELL, OF SAN FRANCISCO, CALIFORNIA.

CUTTER-HEAD AND CUTTER.

SPECIFICATION forming part of Letters Patent No. 598,364, dated February 1, 1898.

Application filed November 3, 1896. Serial No. 610,912. (No model.)

*To all whom it may concern:*

Be it known that I, FRANK EZRA DALZELL, of San Francisco, in the county of San Francisco and State of California, have invented a new and Improved Cutter-Head and Cutter, of which the following is a full, clear, and exact description.

The invention relates to woodworking machinery; and its object is to provide a new and improved cutter-head and cutter more especially designed for turning rosettes, corner-blocks, and the like.

The invention consists of a cutter-head provided with jaws, forming curved slots at adjacent edges for the reception of the cutters.

The invention further consists in a cutter made of thin steel and curved to produce a shearing cut when used.

The invention also consists of certain parts and details and combinations of the same, as will be fully described hereinafter, and then pointed out in the claims.

Reference is to be had to the accompanying drawings, forming a part of this specification, in which similar characters of reference indicate corresponding parts in all the figures.

Figure 1 is a face view of the improvement with part of a cutter broken out. Fig. 2 is a sectional plan view of the same on the line 2 2 of Fig. 1. Fig. 3 is a perspective view of one of the cutters, and Fig. 4 is a face view with the cutters or knives in position.

The improved cutter-head is provided with a face-plate A, formed on its back with the usual threaded boss B, adapted to screw on the spindle of the lathe or other machine on which the cutter-head is to be used. On the front of the face-plate A is held a pair of jaws C C', formed at or near their middle with edges $C^2$ $C^3$, fitted to slide one upon the other, the ends of the edge $C^2$ terminating in edges $C^4$ $C^5$, curved outwardly to the periphery of the jaw C, as plainly indicated in Fig. 1. The ends of the other edge $C^3$ terminate in edges $C^6$ $C^7$, curved outwardly, parallel to the edges $C^4$ $C^5$, respectively, to form with the latter slots, as indicated in Fig. 1.

The peripheries of the jaws C C' are beveled, as at $C^9$ $C^9$, and these bevels are engaged by an annular bevel D', formed on a ring D, screwing on the threaded periphery of the face-plate A. Thus by screwing the ring D inward or outward its bevel D' acts on the bevels $C^8$ $C^9$, and consequently the jaws C and C' are forced toward each other to securely clamp the cutters E in place, the said cutters being inserted with their shanks E' in the slots formed by the adjacent edges $C^4$ $C^6$ and $C^5$ $C^7$ in the jaws C C'.

Each cutter E is made of thin steel and is curved bodily to conform to the shape of the slots between the jaws, the body $E^2$ extending at an angle to the shank E', as indicated in Fig. 3, with the cutting edge $E^3$ shaped according to the work done.

It will be seen that when the ring D is screwed outward the jaws C and C' open sufficiently to permit of inserting the shanks E' of the cutters into the curved slots, and then by screwing the ring D in the inverse direction the bevel D' of the said ring acts on the beveled peripheries of the jaws, so as to force the same inward to clamp the shanks of the cutters. Thus the latter are securely held in place, and owing to their curved shape they have a shearing action on the work, as the cutting begins at the outer end of the cutter, and then cuts gradually inward to the inner cutting edge.

By the arrangement described very thin steel can be used as the material for the cutters, giving considerable strength to the same. The said cutters can also be readily ground to the desired shape.

Fig. 1 of the drawings shows a fragment of one of the knives E in place. The view also shows one of the seats for the knives with nothing therein. In using the invention the two knives, such as the one shown in Fig. 3, are respectively placed between the edges $C^4$ and $C^6$ and $C^5$ and $C^7$. The knives extend throughout the length of the seats between these edges, so that upon the rotation of the cutter-head the knives engage the work at all points within the band D'', except a small centrally-located space at the point between the inner ends of the knives.

Having thus fully described my invention, I claim as new and desire to secure by Letters Patent—

1. A cutter-head having a face-plate, the outer surface of which is plain, a knife, the inner edge of which is rested on the face-plate, the knife projecting outward from the face-plate and having its outer edge sharpened, clamping-jaws lying flat against the outer surface of the face-plate and holding the knife in place, and a ring removably held on the face-plate and engaging the clamping-jaws to hold the same in place, substantially as described.

2. A cutter-head having a circular face-plate, the outer surface of which is approximately at right angles to the axis of the cutter-head, a knife one edge of which is rested on the outer surface of the face-plate, the knife extending perpendicularly to the face-plate and having its outer edge sharpened, two clamping-jaws lying flat against the outer surface of the face-plate and respectively engaging the sides of the knife to hold the same on the face-plate, and a ring encircling the periphery of the face-plate and having an inwardly-overhanging portion capable of engaging and pushing inward the clamping-jaws, substantially as described.

FRANK EZRA DALZELL.

Witnesses:
  W. W. BENCHLEY,
  A. M. JANES.